United States Patent [19]
Pimpinella

[11] Patent Number: 5,956,439
[45] Date of Patent: Sep. 21, 1999

[54] OPTICAL SWITCHING APPARATUS FOR USE IN THE CONSTRUCTION MODE TESTING OF FIBERS IN AN OPTICAL CABLE

[75] Inventor: Richard Joseph Pimpinella, Hampton, N.J.

[73] Assignee: Lucent Technologies Inc., Murray Hill, N.J.

[21] Appl. No.: 08/935,220

[22] Filed: Sep. 22, 1997

[51] Int. Cl.[6] ..................................................... G02B 6/26
[52] U.S. Cl. ................................ 385/16; 385/22; 385/135
[58] Field of Search ................................. 385/16, 19, 20, 385/22, 24, 134, 135, 137, 139, 59, 69, 76, 89

[56] References Cited

U.S. PATENT DOCUMENTS

| | | | |
|---|---|---|---|
| 5,289,558 | 2/1994 | Teichler et al. | 385/135 |
| 5,694,511 | 12/1997 | Pimpinella et al. | 385/134 |
| 5,838,845 | 11/1998 | Leone et al. | 385/16 |

*Primary Examiner*—Hemang Sanghavi

[57] ABSTRACT

An optical switch device for switching test signals to the terminated ends of a predetermined number of optical fibers in an optical fiber cable. The optical switch device contains a first optical port for receiving the test signals. A plurality of optical second ports are provided, wherein the number of second optical ports is less than the number of optical fibers in the cable to be tested. The optical connector ports are connected to the terminated ends of optical fibers in the optical cable by a plurality of detachable adapters. Each of the adapters has a base connector that selectively engages one of the second optical ports on the optical switch device. A plurality of optical leads extends from the base connector of the adaptor. The optical leads terminate with a plurality of plugs that are adapted to selectively engage some of the terminated ends of the optical fibers in the optical cable. The plugs at one end of the adapters are first connected to the optical fibers in the optical cable. The base connectors coupled to the plugs are fewer in number than optical fibers by a ratio of at least 1:2. The base connectors are then connected to the optical switch, thereby allowing for a connection operation that is more time efficient and space efficient than was previously available.

14 Claims, 4 Drawing Sheets

OPTICAL SWITCHING APPARATUS FOR USE IN THE CONSTRUCTION MODE TESTING OF FIBERS IN AN OPTICAL CABLE

RELATED APPLICATIONS

This application is related to the following:

U.S. patent application Ser. No. 08/935,195 entitled METHOD OF TESTING SPLICE CONNECTIONS IN AN OPTICAL FIBER CABLE, filed Sep. 22, 1997, which is incorporated into this application by reference.

BACKGROUND OF THE INVENTION

1. Field of the Invention

The present invention relates to optical switches used to connect the optical fibers in an optical cable to a Remote Fiber Test System (RFTS), when the optical fibers are being laid, repaired or otherwise altered. More particularly, the present invention relates to an optical switch system that selectively directs optical test signals to optical fibers that are part of a fiber administration system when the integrity of those optical fibers are in question.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, fiber administration systems are typically used at the central office to manage the flow of optical signals as they are directed to the various ONUs along the different optical fibers in the network.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein. In such fiber administration systems, the optical distribution frames used at the central office are typically large structures that are arranged in parallel rows. Each optical distribution frame is commonly mounted between the floor and ceiling and only a few feet separate each row of frames.

Each optical distribution frame located at the central office typically defines a plurality of bays, wherein each bay houses several fiber distribution shelves. On each of the fiber distribution shelves are optical couplings that receive the ends of all of the individual optical fibers that enter the central office and are contained within the optical fiber network. By terminating each optical fiber at a coupling on one of the different fiber distribution shelves, the location of each optical fiber becomes known within the overall assembly. Once terminated at a known address on one of the fiber distribution shelves, each optical fiber can be selectively coupled to an HDT or a variety of other pieces of optical equipment located at the central office. As a result, the optical signals sent along each optical fiber can be selectively controlled.

As an optical fiber cable is connected between the optical distribution frame at the central office and the various ONUs at remote locations, the many optical fibers contained within the fiber cable must be spliced at different points along the path. For example, the optical fibers in an optical fiber cable are typically spliced to connector fibers at the outside cable entrance facility (OCEF), where the optical fiber cable enters the central office. The connector fibers extend through conduits in the central office and lead to the optical fiber distribution frame. The various optical fibers are also commonly spliced at one or more manhole locations in between the central office and a grouping of ONUs. As such, most every optical fiber is spliced in more than one location in between the central office and each ONU.

When an optical fiber cable is newly laid, repaired, sliced or otherwise altered, it is important to check the optical integrity in between the central office and each ONU. As a result, each time an optical fiber cable is altered, the integrity of the overall optical pathway must be tested. In many applications, an optical cable exiting the central office contains several different optical ribbons. Each of the ribbons contains a plurality of individual optical fibers, for example, twelve (12) individual optical fibers. When an optical cable is spliced, the cable is cut open and each of the optical ribbons contained within that cable are spliced individually. As such, when one optical ribbon is spliced to another, several different individual optical fibers are being spliced during that operation. If any one of the optical fibers in the optical ribbon fails to splice properly, either that ribbon or the entire optical cable must be cut and re-spliced.

In the prior art, the testing of the integrity and quality of a splice is performed after each splice is completed. Traditionally, such a testing procedure required at least two individuals. One person is the splicer who splices the cable in a manhole or at some other remote location. The second person would be in charge of the test equipment at the central office. The two people would be in communications with one another. When the splice of a single optical ribbon was complete, a test would be initiated. As the test was performed, the integrity of each of the optical pathways could be tested.

In the past, the various optical fibers in a ribbon would be connected to test equipment using an optical switching device such as that described in U.S. patent application Ser. No. 08/709,943, to Pimpinella et al., entitled Optical Switching Apparatus And Method For Use In The Construction Mode Testing Of A Modular Fiber Administration System, the disclosure of which is herein incorporated into this specification by reference. The purpose of such optical testing devices is to connect a single optical testing device to multiple optical fibers and then to switch the testing device to the different optical fibers while testing is being performed. Such optical testing devices therefore have a single optical input that connects to the testing equipment and multiple optical leads that connect to the various optical fibers.

In the central office the space available on any one fiber distribution shelf is very limited. A typical optical cable contains at least seventy two (72) optical fibers. For test equipment to be attached to the optical fibers, at least seventy two separate leads have to be connected between the connector ports on the fiber distribution shelf and the equipment being used to test the optical fibers. The organization of seventy two different leads is very difficult. Often the leads become tangled and unmanageable. Consequently, test equipment is commonly coupled to just one optical ribbon at a time. An optical ribbon typically contains twelve optical fibers. As a result, the person in the central office need only connect twelve leads before testing can occur. After the test is completed, the person and the person at the central office remove the leads from the optical fibers of the first optical ribbon and reconnect those leads to the optical fibers of the next optical ribbon to be tested. As such, in the prior art, such testing is often a time and labor-intensive undertaking.

A need, therefore, exists in the art for an optical switching device that is capable of connecting to all the optical fibers contained in an optical cable at the same time and in a highly organized and time efficient manner, thereby eliminating the step of having to change test equipment from one optical ribbon to another in a testing cycle.

SUMMARY OF THE INVENTION

The present invention is an optical switch device for switching test signals to the terminated ends of a predetermined number of optical fibers in an optical fiber cable. The present invention also includes an adaptor for connecting the optical switch to the optical fibers at opposite ends of the optical cable. The optical switch device contains a first optical port for receiving the test signals. A plurality of optical connector ports are provided, wherein the number of optical connector ports is less than the number of optical fibers in the cable to be tested. The optical connector ports are connected to the terminated ends of optical fibers in the optical cable by a plurality of detachable adapters. Each of the adapters has a base connector that selectively engages one of the optical connector ports on the optical switch device. A plurality of optical leads extend from the base connector of the adaptor. The optical leads terminate with a plurality of plugs that are adapted to selectively engage some of the terminated ends of the optical fibers in the optical cable. The plugs at one end of the adapters are first connected to the optical fibers in the optical cable. The base connectors coupled to the plugs are fewer in number than optical fibers by a ratio of at least 1:2. The base connectors are then connected to the optical switch, thereby allowing for a connection operation which is more time efficient and space efficient than was previously available.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
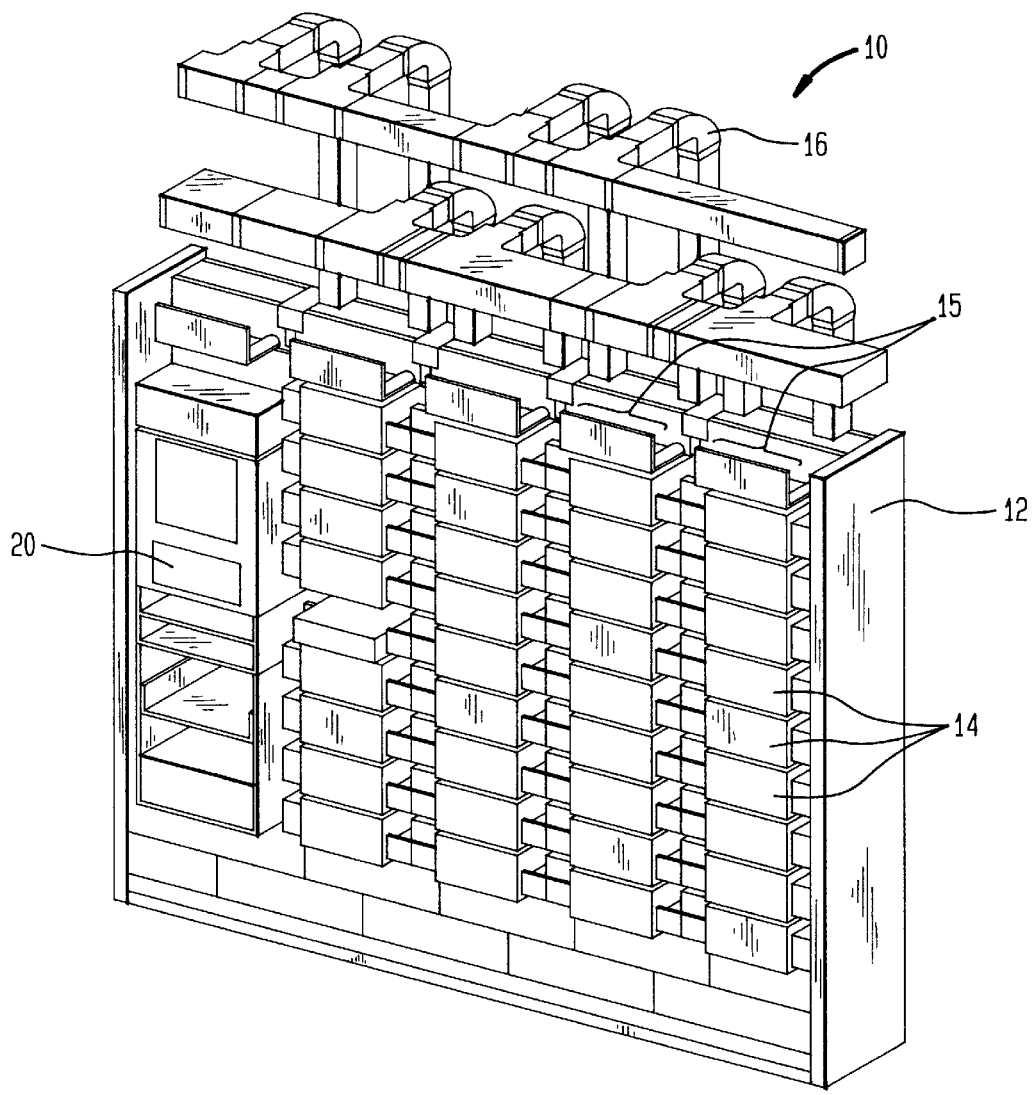
FIG. 1 is a perspective view of a prior art optical fiber distribution frame typical of those located in central offices of an optical fiber network.

In FIG. 1, a fiber administration system 10 is shown. Such administration systems are exemplified by the disclosures of U.S. patent application Ser. No. 08/645,108, entitled AN OPTICAL COMMUNICATIONS SYSTEM HAVING DISTRIBUTED INTELLIGENCE, filed May 13, 1996, and U.S. patent application Ser. No. 08/709,978, entitled FIBER OPTIC OPERATIONS CENTER, filed Sep. 9, 1996. The exemplary fiber administration system 10 includes an optical fiber distribution frame 12 that is affixed in a set position to the floor of a central office. The fiber distribution frame 12 defines a plurality of bays 15. Each bay 15 is a vertical structure that supports a plurality of fiber distribution shelves 14. The fiber distribution shelves 14 come in one of the three standard sizes, having a five inch height, a seven inch height or a nine inch height. A network of conduits 16 lead the various optical fibers from the optical fiber network to the fiber distribution shelves 14.

Contained within the framework of the optical fiber administration system 10 is an optical time domain reflectometer (OTDR) 20 that is used in the testing of the various optical fibers which are part of the fiber administration system 10.

Figure 2:
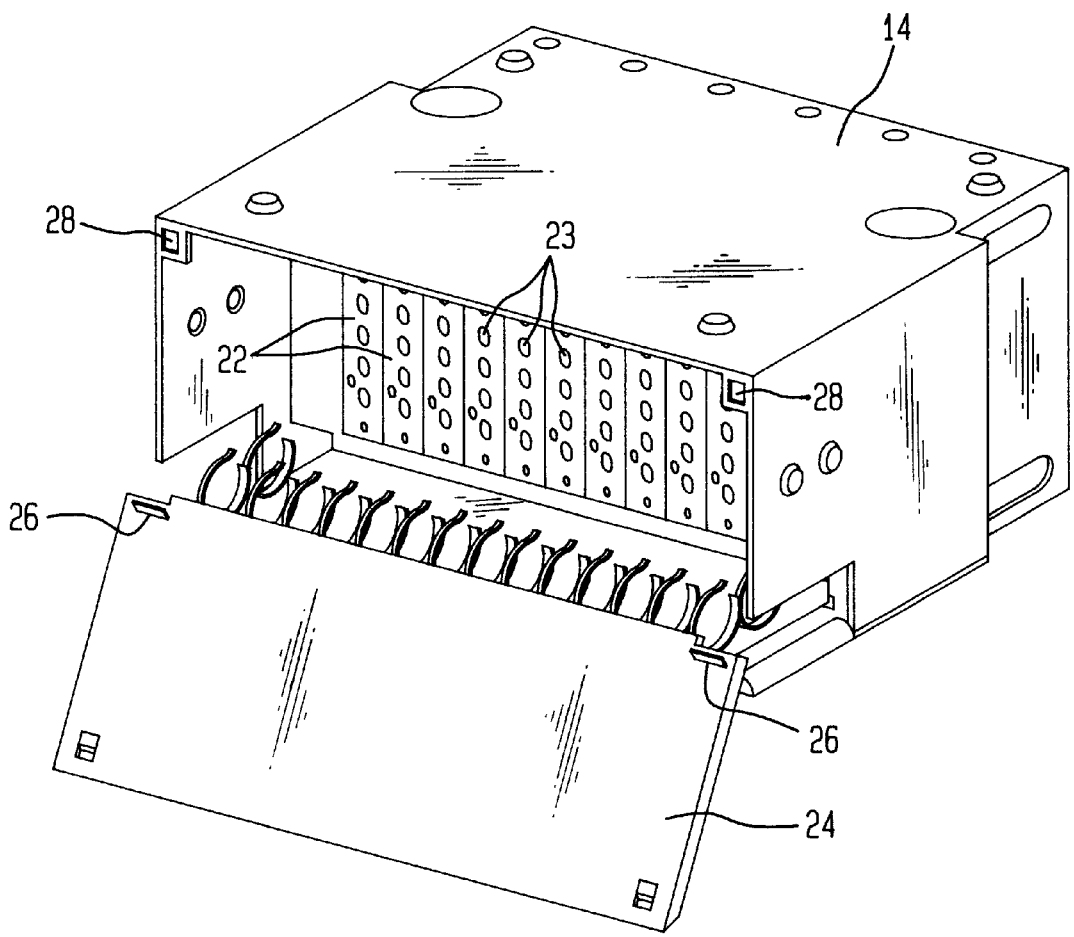
FIG. 2 is a perspective view of a prior art fiber distribution shelf contained within the optical fiber distribution frame of FIG. 1.

Referring to FIG. 2 a typical prior art fiber distribution shelf 14 is shown. The shelf 14 contains a rack of connection modules 22 that receive the various optical fibers contained within an optical cable. Each optical fiber from an optical cable terminates on a distribution shelf at a connector port 23. The connector ports 23 are disposed on the face of the connection modules 22. A protective faceplate 24 connects to the front of the fiber distribution shelf 14 and prevents accidental contact with any optical leads which connect to the connector ports 23 on the connection modules 22. The faceplate 24 engages C-shaped hinge elements 26 disposed on the bottom front edge of the fiber distribution shelf 14. The faceplate 24 pivots about the C-shaped hinge elements 26 to a closed position where the faceplate completely covers the open end of the fiber distribution shelf 14. Once in a closed position, the faceplate 24 engages two locking ports 28 that are disposed near the top front edge of the fiber distribution shelf 14.

Figure 3:
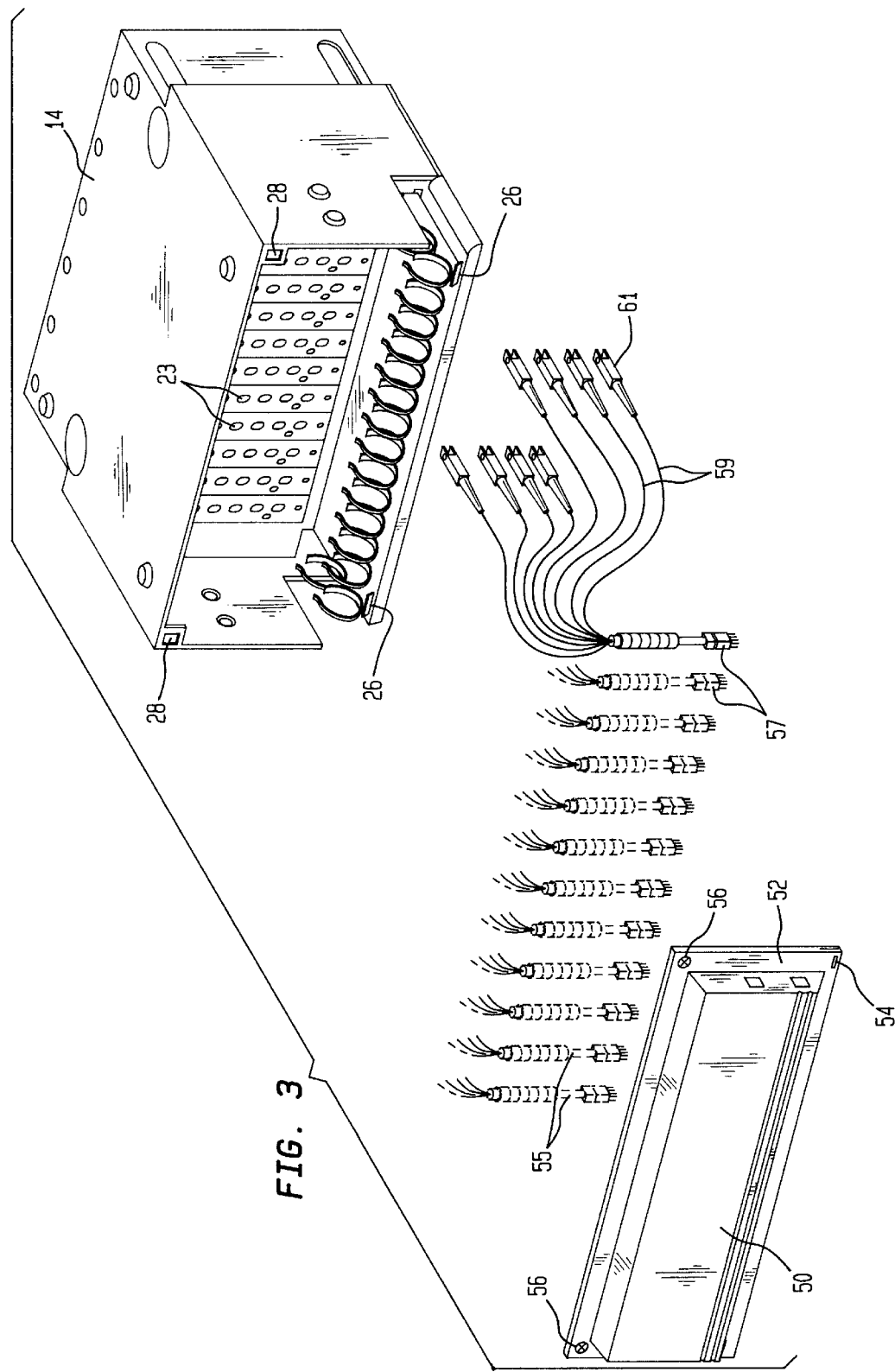
FIG. 3 is a perspective view of one embodiment of the present invention optical switch device shown in conjunction with a prior art fiber distribution shelf.

Referring to FIG. 3, an exemplary optical switching device 50 is shown in accordance with the present invention. The optical switching device 50 is shown in conjunction with a standard fiber distribution shelf 14, such as that previously shown and described in FIG. 2. The optical switching device 50 is affixed to a support plate 52 that is configured with peripheral dimensions that mimic the dimensions of a prior art faceplate 24 (FIG. 2). Accordingly, the support plate 52 has hinge pivots 54 that engage the C-shaped hinge elements 26 on the bottom front edge of the fiber distribution shelf 14. Similarly, the support plate 52 contains twist locks 56 that engage the locking apertures 28 that are disposed on the front top edge of the fiber distribution shelf 14. It will therefore be understood that the optical switching device 50 can be placed in front of a fiber distribution shelf 14 by removing the faceplate 24 (FIG. 2) that normally covers the open front of the shelf and replacing that faceplate with the support plate 52 that supports the optical switching device 50.

Fan-out adapters 55 are provided. The fan-out adapters 55 interconnect the optical components contained within the optical switching device 50 with the various connector ports 23 on the fiber distribution shelf 14. As will be later described in more detail, the fan-out adapters 55 contain a single optical connector base 57 that attaches to the optical switching device 50. Optical leads 59 extend from the base optical connector 57, wherein each of the leads terminates with a plug connector 61 that is adapted to engage a connector port 23 on the fiber distribution shelf 14.

Figure 4:
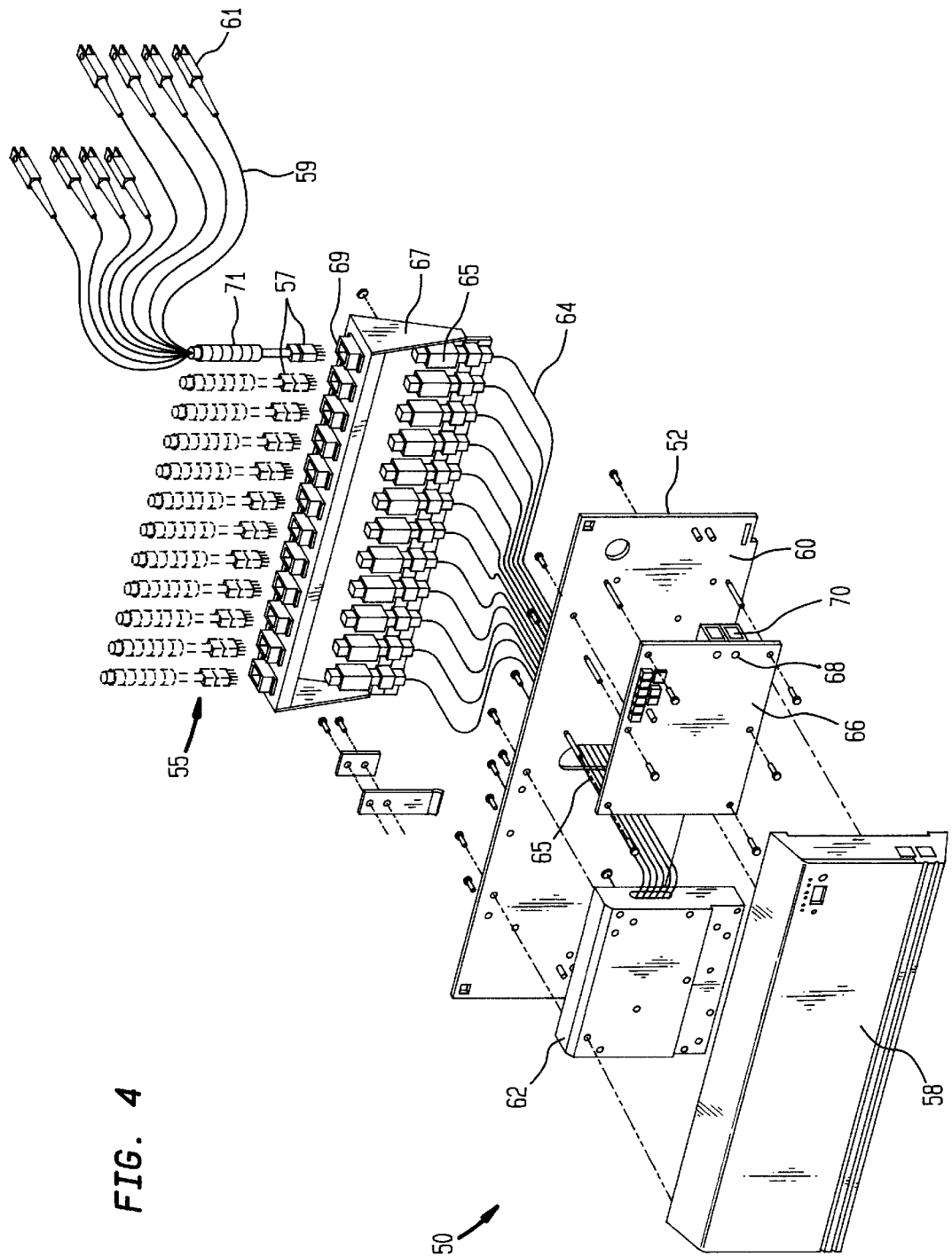
FIG. 4 is an exploded perspective view of one exemplary embodiment of the present invention optical switch device.

FIG. 4, it can be seen that a housing 58 is provided that defines a chamber against the front surface 60 of the support plate 52. Contained within the chamber are the elements that create an optical switch. The form and function of an optical switch is well known in the prior art and need not be set forth herein. However, in the shown embodiment, the optical switch is divided into two distinct modules under the housing 58. The first module is an optical switching module 62 that contains most of the fiber optics and optical circuitry common to an optical switch. A plurality of optical test leads 64 extend from the optical module 62. The test leads 64 extend through an aperture 65 in the support plate 52. The second module is an electronic control module 66 that controls the optical switching module 62. At the side of the electronic control module 66 is an electrical connector 68 and an optical connector 70. The electrical connector 68 provides a means for supplying electronic control signals to the optical switch device 50, although other manners for accomplishing the supply of electronic control signals would be readily apparent to those skilled in the art. The optical connector 70 provides a means for supplying an optical test signal to the optical switch device 50, wherein the optical switch device 50 selectively directs the optical test signal to the various leads 64 that extend from the optical switching module 62.

Each of the test leads 64 extending from the optical switching module 62 terminates at a plug connector 65. A connector tray 67 is affixed to the rear of the support plate 52. An plurality of receptacle connectors 69 are positioned along the length of the connector tray 67. The number of receptacle connectors 69 is the same as the number of test leads 64. The plug connectors 65 at the end of the test leads 64 connect to the bottom of the receptacle connectors 69. These connections are isolated between the support plate 52 and the structure of the connector tray 67.

The tops of the receptacle connectors 69 are adapted to receive the base connector 57 of a fan-out adaptor 55. The base connector 57 of each fan-out adaptor 55 has an elongated rigid body 71 which forms a handle element and makes the base connector 57 easy to hold and manipulate. Accordingly, the base connector 57 of each fan-out adaptor 55 can be readily engaged or disengaged with the receptacle connectors 69 on the connector tray 67. A plurality of optical leads 59 extend from the top of each base connector 57. Each of the optical leads 59 terminates with a connector port plug 61 that is sized to engage the connector ports 23 on the fiber distribution shelf 14 (FIG. 3). Depending upon the age and manufacturer of the fiber administration system, the connector ports on the fiber distribution shelf can have one of a few different configurations. The connector port plugs 61 at the ends of the leads on the fan-out adaptor 55 are selected to match the connector port configuration of the system.

To use the present invention, a person in the home office takes a plurality of fan-out adapters 55 and connects those adapters to the connector ports on a fiber distribution shelf that lead to a targeted optical fiber. The optical switching system is then mounted to the fiber distribution shelf and the base of the fan-out adapters 55 are coupled to the connector tray 67 on the back of the optical switching system.

In a manhole or at some other remote location, fan-out adapters are coupled to the pre-terminated end of the cable that was just added to the fiber network via a splice. The optical switching system is then coupled to the various fan-out adapters. Once completed all of the optical fibers in a cable are connected to an optical switching system at both ends of that optical cable. The optical switching systems can then be used to send test signals along each of the optical fibers in the optical cable and the integrity of the entire optical cable can be tested in a single test cycle.

Although the optical switch device as described can be used on any prior art fiber administration system that used standard sized fiber distribution shelves, the optical switch device is preferably used in a fiber administration system with distributed intelligence, such as that described in U.S. patent application Ser. No. 08/645,108, entitled AN OPTICAL COMMUNICATIONS SYSTEM HAVING DISTRIBUTED INTELLIGENCE, filed May 13, 1996 and U.S. patent application Ser. No. 08/709,978, entitled FIBER OPTIC OPERATIONS CENTER, filed Sep. 9, 1996, both of which being previously incorporated by reference. In such a modular fiber administration system, an optical time domain reflectometer is provided as part of the system, as is a systems controller able to produce any required test signal sequence. As a result, when the optical switching device is joined to such a fiber administration system, the optical connector leading into the optical switching device can be coupled to the optical time domain reflectometer that serves the overall administration system. Furthermore, the electrical connector that leads into the optical switching device can be coupled to the systems controller which serves the overall fiber administration system. Consequently, the optical switching device can be addressed and controlled by the programming of the systems controller. This eliminates the need for a separate optical time domain reflectometer and a separate controller, as was required in certain prior art testing systems.

It will be understood that the embodiments of the present invention specifically shown and described are merely exemplary and that a person skilled in the art can make alternate embodiments using different configurations and functionally equivalent components. All such alternate embodiments are intended to be included in the scope of this invention as set forth in the following claims.

What is claimed is:

1. An optical switch device, comprising:
   an optical switching module;
   a first optical port coupled to said switching module;
   a plurality of second optical ports coupled to said switching module, wherein said optical switching module selectively optically couples each of said second optical ports to said first optical port;
   at least one fan-out adaptor having a base connector adapted to selectively engage one of said second optical ports, wherein a plurality of optical leads extend from said base connector and terminates at a connector port connector of a predetermined configuration.

2. The device according to claim 1, wherein the number of fan-out adapters corresponds to the number of said second optical ports.

3. The device according to claim 1, wherein said at least one fan-out adaptor has at least six optical leads extending from said base connector.

4. The device according to claim 1, wherein said second optical ports are arranged linearly on an optical tray coupled to a rear surface of said optical switch device.

5. The device according to claim 1, wherein internal optical leads extend from said optical switching module to said second optical ports within said optical switching device, wherein said internal optical leads terminate with plugs.

6. The device according to claim 5, wherein said second optical ports have a first side adapted to receive said base connector of a fan-out adaptor and a second side adapted to receive said plug of an internal optical lead.

7. An optical switch device for switching test signals to the terminated ends of a predetermined number of optical fibers in an optical fiber cable, said optical switch device comprising:
   a first optical port for receiving the test signals;
   a plurality of optical second ports, wherein said plurality of second optical ports is less than said predetermined number of optical fibers;

a plurality of detachable adapters, each of said adapters having a base connector adapted to selectively engage one of said second optical ports and a plurality of plugs adapted to selectively engage some of the terminated ends of the optical fibers, wherein said plurality of plugs is coupled to said base connector by a plurality of optical leads.

8. The device according to claim 7, wherein said plurality of adapters and said plurality of plugs extending from said adapters are configured in number to provide at least as many said plugs as said predetermined number of optical fibers.

9. The device according to claim 7, wherein the number of adapters corresponds to the number of said second optical ports.

10. The device according to claim 7, wherein each said adaptor has at least six optical leads extending from said base connector.

11. The device according to claim 7, wherein said optical switch device is configured to attach to a fiber distribution shelf in a fiber administration system.

12. An adaptor device for optically interconnecting an optical switch to the terminated ends of optical fibers contained within an optical cable, said device comprising:

a base connector adapted to selectively engage the optical switch;

a plurality of optical leads extending from said base connector, wherein said base connector optically connects said optical leads to the optical switch when said base connector engages the optical switch;

a plug connector terminating each of said optical leads, wherein said plug connectors are adapted to engage said terminated ends of the optical fibers.

13. The device according to claim 12, wherein said base connector includes an elongated handle element for manually manipulating said base connector.

14. The device according to claim 12, wherein at least six optical leads extend from said base connector.

* * * * *